US012041248B2

(12) United States Patent
Chubach et al.

(10) Patent No.: US 12,041,248 B2
(45) Date of Patent: Jul. 16, 2024

(54) COLOR COMPONENT PROCESSING IN DOWN-SAMPLE VIDEO CODING

(71) Applicant: MediaTek Singapore Pte. Ltd., Singapore (SG)

(72) Inventors: Olena Chubach, San Jose, CA (US); Yu-Wen Huang, Hsinchu (TW); Ching-Yeh Chen, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/865,530

(22) Filed: Jul. 15, 2022

(65) Prior Publication Data

US 2023/0047271 A1 Feb. 16, 2023

Related U.S. Application Data

(60) Provisional application No. 63/228,191, filed on Aug. 2, 2021.

(51) Int. Cl.
*H04N 19/186* (2014.01)
*H04N 19/132* (2014.01)
*H04N 19/182* (2014.01)

(52) U.S. Cl.
CPC ......... *H04N 19/186* (2014.11); *H04N 19/132* (2014.11); *H04N 19/182* (2014.11)

(58) Field of Classification Search
CPC ... H04N 19/132; H04N 19/182; H04N 19/186
See application file for complete search history.

(56) References Cited

U.S. PATENT DOCUMENTS

| 2006/0072673 A1 | 4/2006 | Holcomb et al. |
| 2011/0286530 A1 | 11/2011 | Tian et al. |
| 2016/0156912 A1 | 6/2016 | Aishina et al. |

(Continued)

FOREIGN PATENT DOCUMENTS

| GB | 202018755 | 1/2021 | |
| WO | WO-2019072097 A1 * | 4/2019 | ............. G06T 9/002 |

OTHER PUBLICATIONS

"AHG9: Convolutional Neural Network Filter for inter frame"—Yao et al.; Joint Video Experts Team (JVET) of ITU-T SG 16 WP 3 and ISO/IEC JTC 1/SC 29/WG 11; 10th Meeting: San Diego, US, Apr. 10-20, 2018 (Year: 2018).*

(Continued)

*Primary Examiner* — Mainul Hasan
(74) *Attorney, Agent, or Firm* — Han IP PLLC; Andy M. Han

(57) ABSTRACT

A down-sample video coding system is provided. A decoding system receives to be decoded data from a bitstream for one or more pictures of a video. Each picture includes pixels having different color components. The decoding system receives up-down-sampling parameters that are applicable to a current video unit in the received data. The up-down-sampling parameters include different subsets for different color components. The decoding system decodes the data to reconstruct the current video unit. The decoding system up-samples the reconstructed current video unit according to the up-down-sampling parameters. The different color components of the current video unit are up-sampled according to different subsets of the up-down-sampling parameters.

20 Claims, 9 Drawing Sheets

(56) References Cited

U.S. PATENT DOCUMENTS

| | | | |
|---|---|---|---|
| 2016/0316215 A1* | 10/2016 | Minoo | H04N 19/176 |
| 2019/0014348 A1* | 1/2019 | Ye | H04N 19/30 |
| 2020/0244991 A1* | 7/2020 | Li | H04N 19/587 |
| 2020/0402205 A1* | 12/2020 | Su | G06T 5/70 |
| 2021/0150812 A1* | 5/2021 | Su | G06F 18/285 |
| 2021/0166350 A1 | 6/2021 | Wang et al. | |
| 2021/0211643 A1* | 7/2021 | Da Silva Pratas Gabriel | G06T 3/4046 |
| 2022/0030271 A1* | 1/2022 | Li | H04N 19/132 |

OTHER PUBLICATIONS

"AHG9: Convolutional Neural Network Filter for inter frame"—Jiabao Yao, Xiaodan Song, Shuqing Fang, Li Wang; JVET 10th Meeting: San Diego, US, Apr. 10-20, 2018 (Year: 2018).*
Taiwan Intellectual Property Office, Office Action in Taiwan Patent Application No. 111128906, May 4, 2023.
China National Intellectual Property Administration, International Search Report for PCT Application No. PCT/CN2022/109440, Oct. 21, 2022.

* cited by examiner

COLOR COMPONENT PROCESSING IN DOWN-SAMPLE VIDEO CODING

CROSS REFERENCE TO RELATED PATENT APPLICATION(S)

The present disclosure is part of a non-provisional application that claims the priority benefit of U.S. Provisional Patent Application No. 63/228,191, filed on 2 Aug. 2021. Content of above-listed application is herein incorporated by reference.

TECHNICAL FIELD

The present disclosure relates generally to video coding. In particular, the present disclosure relates to methods of coding Y/Cr/Cb components in Neural Network (NN) based video coding.

BACKGROUND

Unless otherwise indicated herein, approaches described in this section are not prior art to the claims listed below and are not admitted as prior art by inclusion in this section.

Versatile Video Coding (VVC) is a codec designed to meet upcoming needs in videoconferencing, over-the-top streaming, mobile telephony, etc. VVC is meant to be very versatile and address all the video needs from low resolution and low bitrates to high resolution and high bitrates, high dynamic range (HDR), 360 omnidirectional, etc. VVC supports YCbCr color spaces with 4:2:0 sampling, 10 bits per component, YCbCr/RGB 4:4:4 and YCbCr 4:2:2, with bit depths up to 16 bits per component, with HDR and wide-gamut color, along with auxiliary channels for transparency, depth, and more.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a down-sample video coding system. At the encoder side, an encoding system receives pixels having different color components for a current video unit as video data. The current video unit may be any one of a picture, a frame, a group of pictures, a sequence, a slice, a coding tree unit (CTU), a coding unit, or a block of samples. The encoding system down-samples the video data according to a set of up-down-sampling parameters for the current video unit. The different color components of the current video unit are down-sampled according to different subsets of the up-down-sampling parameters. The encoding system encodes the down-sampled video data for the current video unit into a bitstream. The encoding system also signals the up-down-sampling parameters to a video decoder.

At the decoder side, a decoding system receives to be decoded data from a bitstream for the current video unit. The decoding system receives the up-down-sampling parameters that are applicable to the current video unit. The up-down-sampling parameters include different subsets for different color components. The decoding system decodes the data to reconstruct the current video unit. The decoding system up-samples the reconstructed current video unit according to the up-down-sampling parameters. The different color components of the current video unit are up-sampled according to different subsets of the up-down-sampling parameters.

The up-down-sampling parameters may include a first down-sampling ratio for a first color component and a second down-sampling ratio for a second color component. The up-down-sampling parameters may include a first reduced or effective bit-depth for a first color component and a second reduced bit-depth for a second color component (reduced effective bit-depth due to down-sampling.) The up-down-sampling parameters may include a first flag for enabling down-sampling for a first color component and a second flag for enabling down-sampling for a second color component. The up-down-sampling parameters may include a first flag for enabling down-sampling for a first color component and a second flag for enabling down-sampling for a second color component. The up-down-sampling parameters specify a first up-sampling method for a first color component and second sampling method for a second color component. The first and second up-sampling methods may be selected from multiple up-sampling options that include using a neural network or a standard up-sampling filter.

The different color components of the current video unit are down-sampled according to different subsets of the up-down-sampling parameters. The different subsets of the up-down-sampling parameters may include a first subset for luma pixels and second subset for chroma pixels. The different subsets of the up-down-sampling parameters may include three subsets for three different color components (e.g., Y/Cb/Cr, or R/G/B) respectively.

The up-down-sampling parameters may include parameters signaled expressly (as syntax elements) in the bitstream. The up-down-sampling parameters may also include parameters that can be derived implicitly from characteristics of the current video unit or other information available to a decoding system without express signaling.

The up-down-sampling parameters may include parameters that changes from a first video unit to a second video unit. The up-down-sampling parameters may include parameters that are explicitly signaled in the bitstream and may be contained in one of a sequence parameter set (SPS), a picture parameter set (PPS), a picture header (PH). The up-down-sampling parameters may include parameters that are applicable at slice level, coding tree unit (CTU) level, coding unit (CU) level, or block level.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Figure 1:
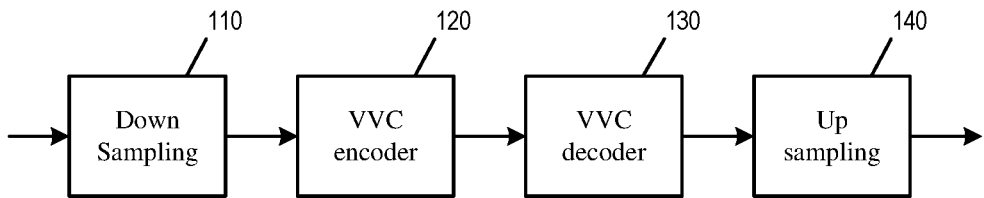
FIG. 1 conceptually illustrates the data flow of a down-sampling coding.

Down-sample coding is a video coding technique used to meet low-bit rate constraints. Specifically, the video source is down-sampled before being encoded into low-bit-rate coded video (e.g., bitstreams). At the decoder side, the low-bit-rate coded video is decoded into low resolution video, which is then up-sampled into higher resolution or full resolution video. FIG. 1 conceptually illustrates the data flow of a down-sampling coding. As illustrated, video is down sampled (by a down-sampling system 110), encoded (by encoder 120), and decoded (by decoder 30) according to a video coding standard such as VVC. The decoded video is then up-sampled (by an up-sampling system 140). Down-sampled coding can have better coding efficiency than that of original resolution coding, particularly when high-resolution sequences are encoded in the low-bit rate conditions.

VVC allows picture resolution change at a certain position within a sequence, without the need to encode an instantaneous decoder refresh (IDR) or intra random access picture (IRAP). This feature of VVC is sometimes referred to as Reference picture resampling (RPR). With RPR, considerable coding gain is achieved while bitrate leap still exists. Some experiments regarding changing the resolution within a sequence have been conducted using RPR coding. Table 1 shows the results of several 4K sequences having good coding gains by using RPR.

TABLE 1

| | | Random access Main10 Over VTM-11.0 (QP 32, 37, 42, 47) | | | | |
|---|---|---|---|---|---|---|
| | | Y BD-rate | Cb BD-rate | Cr BD-rate | EncT | DecT |
| Cass A1 4K | Tango2 | −9.44% | −3.07% | 2.49% | 55% | 29% |
| | FoodMarket4 | −9.93% | 2.52% | 2.89% | | |
| | Campfire | −13.09% | 15.79% | 7.71% | | |
| Class A2 4K | CatRobot1 | −0.34% | 22.92% | 29.23% | 48% | 29% |
| | DaylightRoad2 | 4.40% | 3.05% | 3.55% | | |
| | ParkRunning3 | −8.94% | 121.76% | 45.88% | | |

In the experiment of Table 1, the case of ScalingRatioHor (horizontal down-sampling ratio) and ScalingRatioVer (vertical down-sampling ratio) equal to 2.0 (½ resolution) is tested. The quantization parameter (QP) range of anchor is 32, 37, 42, and 47, and that of RPR coding is 27, 32, 37, and 42. Peak signal to noise ratio (PSNR) between the original sequence and the decoded up-sampled (-UpscaledOutput=2) sequence is calculated. In the test, the temporal pre-filter is applied on in both anchor and RPR coding.

Figure 2:
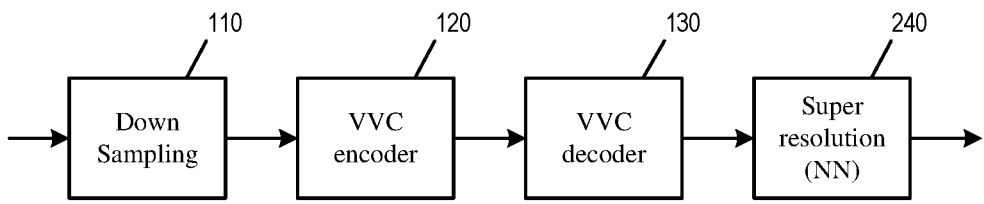
FIG. 2 conceptually illustrates the data flow of a down-sampling coding using super-resolution.

Super-resolution technologies using neural networks can be used to improve coding efficiency of down-sampled coding. Thus, instead of up-sampling filtering, a video decoder may apply super-resolution to the frames of the sequence. FIG. 2 conceptually illustrates the data flow of a down-sampling coding using super-resolution. As illustrated, the up-sampling stage is performed by a super resolution neural network 240.

Figure 3:
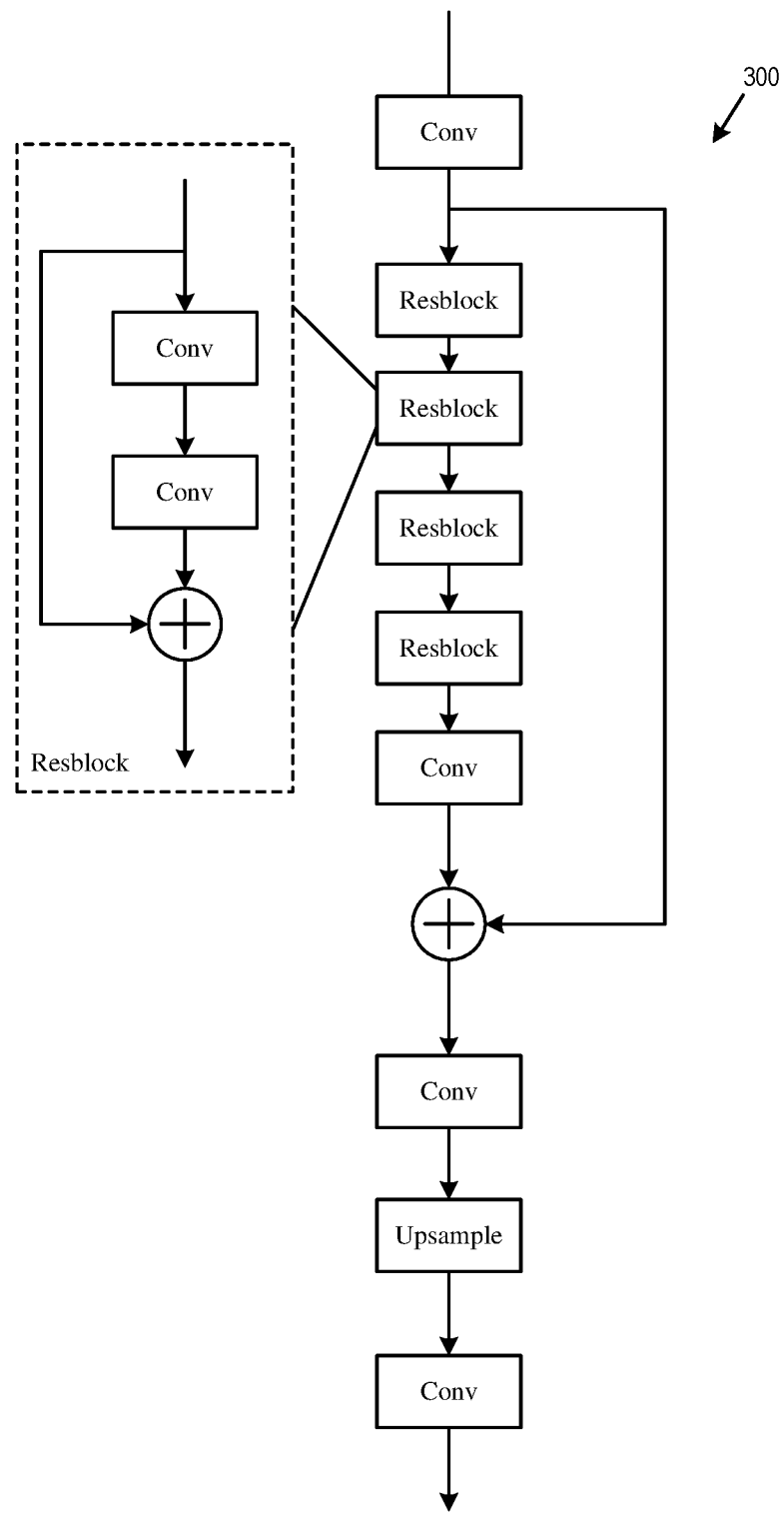
FIG. 3 conceptually illustrates an example neural network framework for super-resolution.

FIG. 3 conceptually illustrates an example neural network framework 300 for super-resolution. The framework 300 can be used to implement the super-resolution neural network 240. As illustrated, the neural network framework 300 is based on 12 layers of network. The loss function is the L1 norm, and part of the BVI-DVC training database for deep video compression is used as training sequences. The last convolutional layer parameters can be re-trained by each sequence and each QP, those parameters can be encoded, and the bit rate of the encoded parameters is included in the resulting bit rate.

Table 2 shows BD-rates by a super-resolution network compared to BD-rate by an up-sampling filter by RPR.

TABLE 2

| BD rates (%) by super-resolution (QP 27, 32, 37, 42) | | | | | | |
|---|---|---|---|---|---|---|
| | | Random access Main10 Over up-sampling filtering in Table 1 | | | | |
| | | Y BD-rate | Cb BD-rate | Cr BD-rate | EncT | DecT |
| Cass A1 4K | Tango2 | −0.37% | −4.72% | −2.67% | 100% | 581% |
| | FoodMarket4 | −0.98% | −0.62% | −2.36% | | |
| | Campfire | −2.65% | −1.78% | −4.27% | | |

TABLE 2-continued

BD rates (%) by super-resolution (QP 27, 32, 37, 42)

| | | Random access Main10 Over up-sampling filtering in Table 1 | | | | |
|---|---|---|---|---|---|---|
| | | Y BD-rate | Cb BD-rate | Cr BD-rate | EncT | DecT |
| Class A2 4K | CatRobot1 | −4.96% | −4.09% | −4.63% | 100% | 528% |
| | DaylightRoad2 | −5.99% | −3.13% | −2.48% | | |
| | ParkRunning3 | −2.44% | −4.07% | 4.11% | | |

Table 3 shows BD-rates by the super-resolution compared to VTM-11.0 (QP 32, 37, 42, 47).

TABLE 3

BD rates (%) of half-resolution coding with super-resolution

| | | Random access Main10 Over VTM-11.0 (QP 32, 37, 42, 47) | | | | |
|---|---|---|---|---|---|---|
| | | Y BD-rate | Cb BD-rate | Cr BD-rate | EncT | DecT |
| Cass A1 4K | Tango2 | −9.78% | −7.64% | −0.21% | 55% | 170% |
| | FoodMarket4 | −10.77% | 2.04% | 0.55% | | |
| | Campfire | −15.34% | 13.60% | 3.29% | | |
| Class A2 4K | CatRobot1 | −4.63% | 18.21% | 23.62% | 48% | 154% |
| | DaylightRoad2 | −0.57% | −0.03% | 1.09% | | |
| | ParkRunning3 | −11.17% | 114.24% | 51.05% | | |

Although the balance of gain between color components is not adjusted, the improvement of coding gains has been shown because of the much higher importance in luma than that in chroma.

Figure 4:
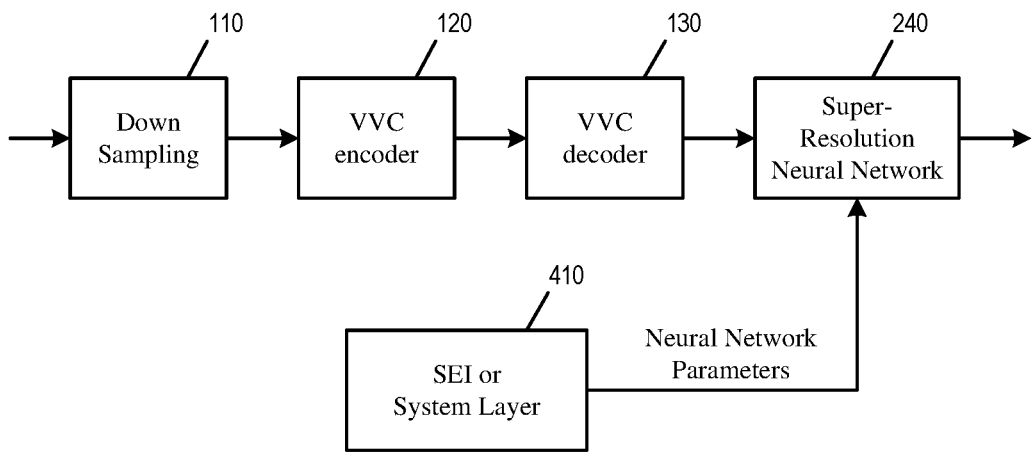
FIG. 4 conceptually illustrates a framework for sending network parameters to the super-resolution neural network.

FIG. 4 conceptually illustrates a framework for sending network parameters to the super-resolution neural network 240. As illustrated, a supplemental enhancement information (SEI) message 410 can be used to send the neural network parameters to the super-resolution neural network 240. The neural network parameters can also be sent by system layer.

In some embodiments, down-sampling coding is based on a framework in which a super-resolution post-filter uses convolutional neural network (CNN). In this framework, as the neural network is updated, the network parameters can be signaled to the decoder in a bitstream. It is empirically determined that, sending partial network parameters to dynamically update the super-resolution neural network can improve coding efficiency compared to a fixed network in which the network parameters are fixed and do not update.

Some embodiments of the disclosure provide options for performing down-sampled coding, i.e., encoding video at lower resolution (down-sampled version) instead of encoding the video at the original resolution. The video coder may switch resolution at sequence level, at group of pictures (GOP) level, at picture/frame level, at CTU level, at CU level, or at block level for I/P/B slices. The video coder may switch resolution (e.g., down-sampling) of all color components (luma and chroma, Y/Cb/Cr, R/G/B) together or at the same time, at the same ratio. For some embodiments, a "pixel" may refer to all three color components, while a "sample" may refer to just one color component.

In some embodiments, the video coder (encoder or decoder) signals multiple control flags for different color components. For example, the video coder may use two control flags for enabling subsampling (or down-sampling), a first flag enabling subsampling for luma and a second flag enabling subsampling for chroma. The video coder may apply different subsampling ratios, e.g., a first ratio for luma component (Y) and a second ratio for chroma (Cb and/or Cr) components. The video coder may use three control flags for enabling subsampling: a first flag enabling subsampling for luma component, a second flag enabling subsampling for Cb component, and a third flag enabling subsampling for Cr component. In some embodiments, the RGB format is used, and the video coder may use a first flag enabling subsampling for R (red) component, a second flag enabling subsampling for G (green) component, and a third flag enabling subsampling for B (blue) component Usually, in a YCbCr video, chroma components are more "flat" (having less changes) than luma component. In some embodiments, the subsampling ratio for different color components are signaled separately, such that Y, Cb, and Cr components may have their respective different down-sampling ratios.

The video coder may dynamically reduce the spatial/temporal resolutions and the effective bit depth of a YCbCr video at the encoder and restore the original video spatial/temporal resolution during decoding. In some embodiments, the video coder may adjust the effective bit depth for each component separately. For example, the Cb/Cr (chroma) components can be encoded with a bit depth lower than the internal bit depth, while the Y (luma) component is encoded with a maximum bit depth. A separate flag indicating the effective bit depth can be either signaled for each of the Y/Cb/Cr components, or separately for Y and Cb/Cr components.

All of these flags and control signals (enabling subsampling, sampling ratio, effective bit depth) for separate color components (luma/chroma, or Y/Cr/Cb) can be signaled in sequence parameter set (SPS), or in picture parameter set (PPS), or in picture header (PH), or at slice level, or at coding tree unit (CTU) level, or at coding unit (CU) level, or at block-level.

In some embodiments, whether the down sampling coding (spatial subsampling, effective bit-depth, or both) is applied to any of the Y/Cb/Cr component is derived at the decoder, meaning that no additional signaling is needed at lower level. In some embodiments, only high level signaling is performed to indicate whether the down-sampling coding is enabled or not; and at the lower levels, the decision is defined at the decoder side. For example, in some embodiments, if quantization parameter (QP) is greater than a certain threshold, then down-sampling is used, otherwise original resolution is used.

In some embodiments, each input frame is divided into non-overlapping blocks (e.g., CTUs), and for each block there are three candidate modes: full-resolution coding, low-resolution coding with discrete cosine transform-based interpolation filter (DCTIF) based up-sampling, and low-resolution coding with CNN-based up-sampling. If the video coder chooses full-resolution coding mode for a CTU, the CTU will be compressed in the manner of "normal" HEVC or VVC coding. Otherwise, if the video coder chooses one of the two low-resolution coding modes for the CTU, the CTU will be first down-sampled by a factor of 2 along both horizontal and vertical directions by a using filter.

In some embodiments, the video coder may use more than one down-sampling options as well as more than one up-sampling options (pre-defined in a video coding standard), and the selection of one or more of these options can be signaled at SPS/PPS/PH/slice/CTU/CU/block-level. In some embodiments, the selection of multiple up-sampling methods is derived at the decoder side without explicit signaling. For example, the selection of multiple up-sampling methods may depend on one or a combination of the prediction mode, block width, block height, block size, partition, motion information, intra prediction direction, slice type, color component, scaling ratio, and so on.

In some embodiments, different up-sampling methods can be applied to different color components in one block. The selection of different up-sampling methods can be explicitly signaled to the decoder or implicitly derived at the decoder side. The signaling of selected different up-sampling methods for different color components can be performed jointly or independent for each component. For example, only one indicator may be signaled to select the up-sampling methods for all three components (Y/Cr/Cb). In some embodiments, two indicators are signaled to select the up-sampling methods for luma (Y) and chroma (Cr/Cb) components, respectively. In another embodiment, three indicators are signaled for three components individually.

In some embodiments, the video coder may signal a user-defined method in some high-level parameter set, such as APS, and use the signaled user-defined method to perform up-sampling/down-sampling. The user-defined method may use a traditional filter or a NN-based filter.

Thus, the video coder may signal multiple control flags for different color components. Two or more flags may be signaled to indicate enabling/disabling of subsampling for luma and chroma, respectively. Two different subsampling ratios may be signaled separately for luma (Y) and chroma (Cr/Cb) components, or three different subsampling ratios may be signaled separately for Y, Cb, and Cr (or for R, G, B) components. Effective bit-depths for each color component may also be adjusted separately. The video coder may also select from multiple down-sampling/up-sampling options for each color component by either explicit or implicit signaling. The selection of an up-sampling method from multiple different up-sampling methods can be explicitly signaled to decoder or implicitly derived at decoder.

Figure 5:
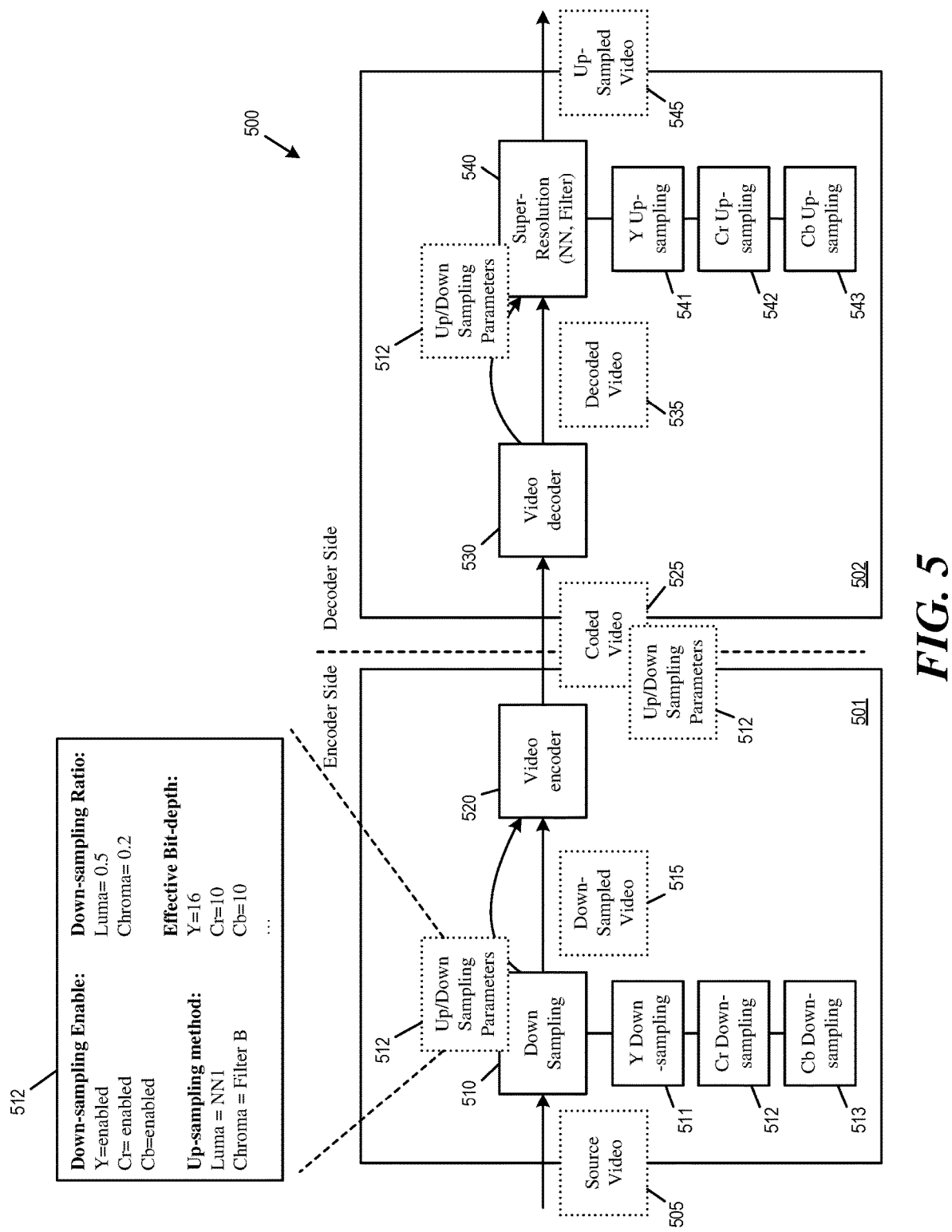
FIG. 5 illustrates an example down-sampling coding in a video coding system that uses separate parameters for different color components.

FIG. 5 illustrates down-sampling coding in a video coding system 500 that uses separate parameters for different color components. As illustrated, the video coding system 500 includes a down-sampling system 510, a video encoder 520 at its encoder side 501. The video coding system 500 includes a video decoder 530 and a super resolution system 540 at its decoder side 502. The down sampling system 510 may be part of a video encoding system 501 that includes the video encoder 520, while the super resolution system 540 may be part of a video decoding system 502 that includes the video decoder 530.

The down sampling system 510 receives a source video 505 and performs down-sampling to create down sampled video 515. The down-sampling operation is performed according to a set of up/down sampling parameters 512.

The up/down sampling parameters 512 include parameters regarding enabling/disabling of up/down sampling, down-sampling ratio, effective bit-depth, and up-sampling method. The up/down sampling parameters 512 may include parameters that are applicable to all color components. The up/down sampling parameters 512 may include parameters that are applicable to only the luma component and parameters that are applicable to only the chroma components. The up/down sampling parameters 512 may include parameters that are applicable to only the Y component, parameters that are applicable to only the Cr component, and parameters that are applicable to only the Cb component. The down sampling system 510 may perform down-sampling for different color components based on their corresponding up/down sampling parameters. In the figure, the down-sampling system 510 includes separate modules (software or hardware) 511-513 for performing down-sampling for different color components based on their corresponding down-sampling parameters.

The down sampled video 515 is provided to the video encoder 520, which performs video encoding/compression according to a particular video coding standard (e.g., VVC, HEVC, etc.) to create a coded video 525 (bitstream). An example video encoder is described by reference to FIG. 7 below. At least some of the up/down sampling parameters 512 are signaled as syntax elements in the coded video 525 at various video coding hierarchies (e.g., SPS/PPS/PH/slice/CTU/CU/block-level). Some of the up/down sampling parameters 512 may not be signaled explicitly in the coded video 525, but are inferred from other parameters that are commonly known to both encoder and decoder, such as the value of QP, etc.

The coded video 525 is provided to the video decoder 530, which performs video decoding/decompression according to the same particular video coding standard (e.g., VCC, HEVC, etc.) to create a decoded video 535. An example video decoder is described by reference to FIG. 9 below. The decoded video 535 is provided to the super-resolution system 540 to be up-sampled. The video decoder 530 also extracts at least some of the up/down sampling parameters 512 from the syntax elements in coded video 525, while some of the up/down sampling parameters 512 are derived implicitly. The extracted and/or derived up/down sampling parameters 512 are also provided to the super-resolution system 540.

The super-resolution system 540 performs up-sampling on the decoded video 535 based on the up/down sampling parameters 512 to produce the final up-sampled video 545. The super-resolution system 540 may perform up-sampling for different color components based on their corresponding parameters in the up/down sampling parameters 512. In the figure, the super-resolution system 540 include separate modules (software or hardware) 541-543 for performing up-sampling for different color components based on their corresponding down-sampling parameters. For example, the up/down sampling parameters 512 may specify that the Y up-sampling module 541 uses neural network to up-sample the luma component, and that the Cr and Cb up-sampling modules 542 and 543 use a standard filter to up-sample the chroma components.

A set of up/down sampling parameters such as the set of up/down sampling parameters 512 may be applicable to one particular video unit. Such a video unit may be a sequence, a group of pictures (GOP), a picture, a frame, a slice, a CTU, a CU, or another entity at a video coding hierarchy. A first set of up/down sampling parameter may be applied to color components of a first video unit, while a second, different set of up/down sampling parameters may be applied to color components of a second video unit.

Figure 6:
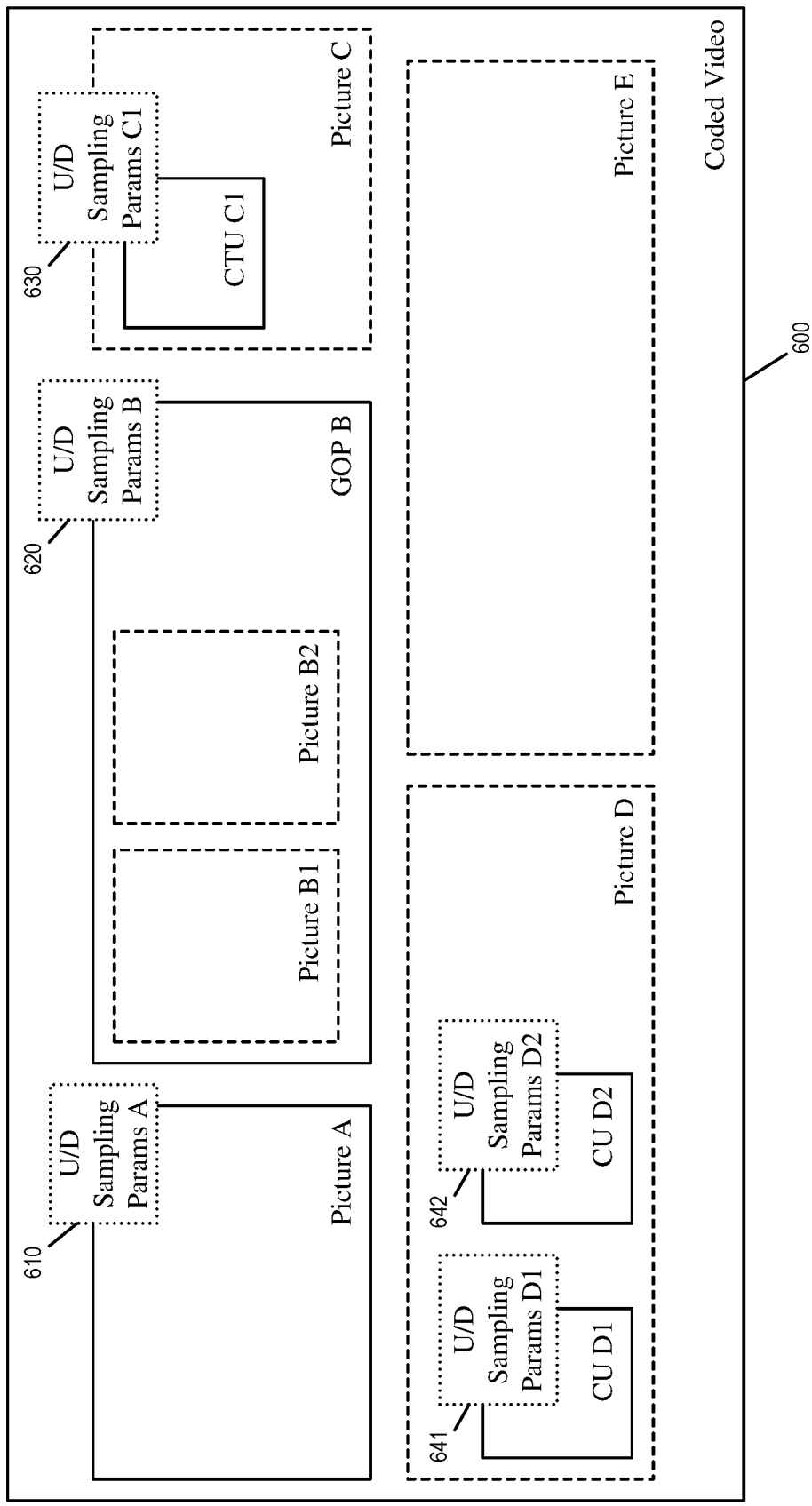
FIG. 6 conceptually illustrates a coded video having different sets of up-down sampling parameters that are applicable to different video units.

FIG. 6 conceptually illustrates a coded video having different sets of up-down sampling parameters that are applicable to different video units. As illustrated, a coded video 600 (e.g., bitstream) includes video units at various levels of video coding hierarchy. The coded video also includes multiple different sets of up/down sampling parameters that are applicable to different video units, such as a parameter set 610 that is applicable to a picture A, a parameter set 620 that is applicable to a GOP B, a parameter set 631 that is applicable to a CTU C1 in picture C, parameter sets 641 and 642 that are applicable to CUs D1 and D2 in picture D.

Though not illustrated, in some embodiments, different sets of up/down sampling parameters may specify sampling parameters for different color components in different formats, for example, a first set of up/down sampling parameters may specify three subsets for three different color components (e.g., Y/Cb/Cr, R/G/B), while a second set of up/down sampling parameters may specify two different color components (e.g., luma and chroma).

Figure 7:
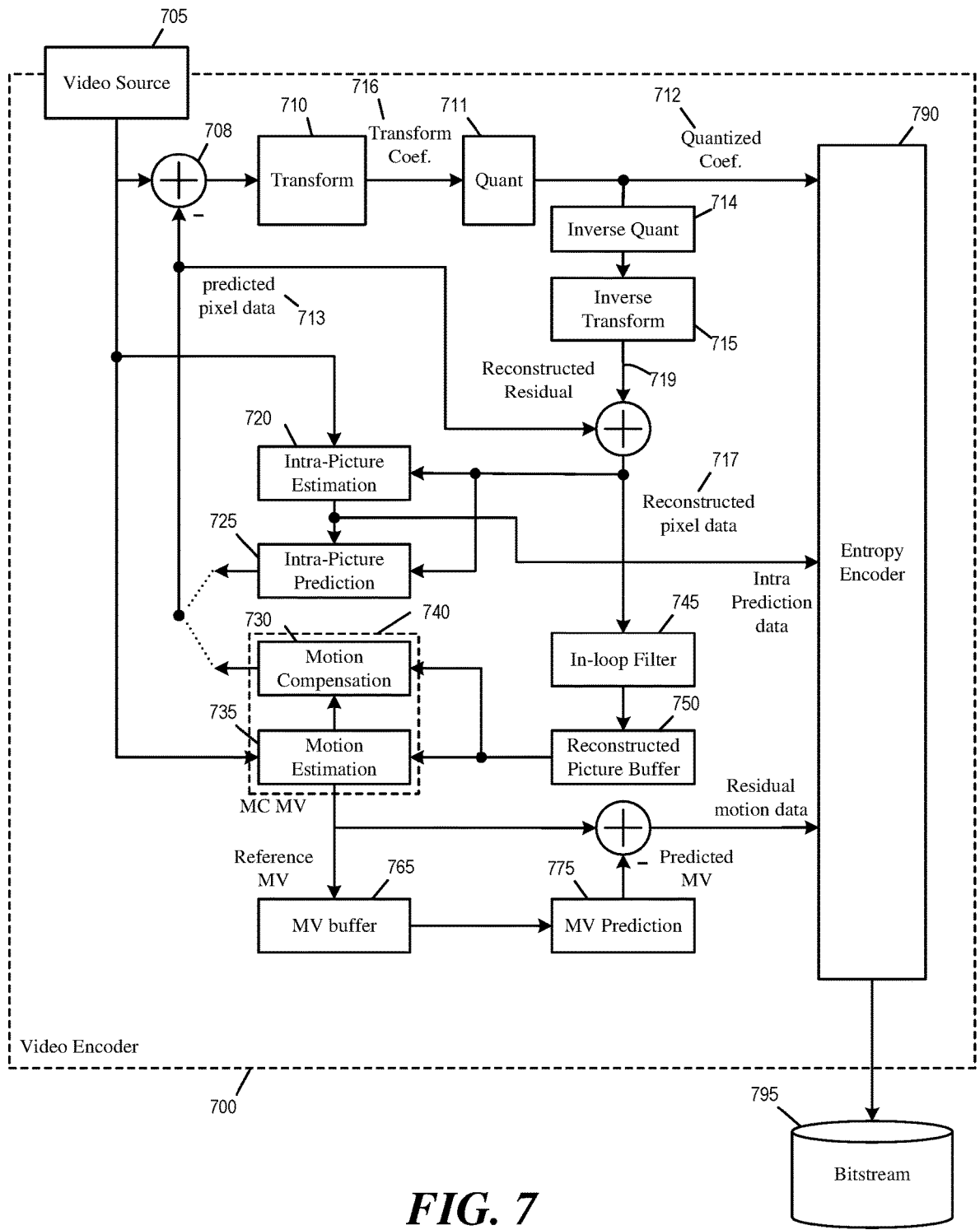
FIG. 7 illustrates an example video encoder that can be used to encode down-sampled video.

FIG. 7 illustrates an example video encoder 700 that can be used to encode down-sampled video. As illustrated, the video encoder 700 receives input video signal from a video source 705 and encodes the signal into bitstream 795. The video encoder 700 has several components or modules for encoding the signal from the video source 705, at least including some components selected from a transform module 710, a quantization module 711, an inverse quantization module 714, an inverse transform module 715, an intra-picture estimation module 720, an intra-prediction module 725, a motion compensation module 730, a motion estimation module 735, an in-loop filter 745, a reconstructed picture buffer 750, a MV buffer 765, and a MV prediction module 775, and an entropy encoder 790. The motion compensation module 730 and the motion estimation module 735 are part of an inter-prediction module 740.

In some embodiments, the modules 710-790 are modules of software instructions being executed by one or more processing units (e.g., a processor) of a computing device or electronic apparatus. In some embodiments, the modules 710-790 are modules of hardware circuits implemented by one or more integrated circuits (ICs) of an electronic apparatus. Though the modules 710-790 are illustrated as being separate modules, some of the modules can be combined into a single module.

The video source 705 provides a raw video signal that presents pixel data of each video frame without compression. A subtractor 708 computes the difference between the raw video pixel data of the video source 705 and the predicted pixel data 713 from the motion compensation module 730 or intra-prediction module 725. The transform module 710 converts the difference (or the residual pixel data or residual signal 708) into transform coefficients (e.g., by performing Discrete Cosine Transform, or DCT). The quantization module 711 quantizes the transform coefficients into quantized data (or quantized coefficients) 712, which is encoded into the bitstream 795 by the entropy encoder 790.

The inverse quantization module 714 de-quantizes the quantized data (or quantized coefficients) 712 to obtain transform coefficients, and the inverse transform module 715 performs inverse transform on the transform coefficients to produce reconstructed residual 719. The reconstructed residual 719 is added with the predicted pixel data 713 to produce reconstructed pixel data 717. In some embodiments, the reconstructed pixel data 717 is temporarily stored in a line buffer (not illustrated) for intra-picture prediction and spatial MV prediction. The reconstructed pixels are filtered by the in-loop filter 745 and stored in the reconstructed picture buffer 750. In some embodiments, the reconstructed picture buffer 750 is a storage external to the video encoder 700. In some embodiments, the reconstructed picture buffer 750 is a storage internal to the video encoder 700.

The intra-picture estimation module 720 performs intra-prediction based on the reconstructed pixel data 717 to produce intra prediction data. The intra-prediction data is provided to the entropy encoder 790 to be encoded into bitstream 795. The intra-prediction data is also used by the intra-prediction module 725 to produce the predicted pixel data 713.

The motion estimation module 735 performs inter-prediction by producing MVs to reference pixel data of previously decoded frames stored in the reconstructed picture buffer 750. These MVs are provided to the motion compensation module 730 to produce predicted pixel data.

Instead of encoding the complete actual MVs in the bitstream, the video encoder 700 uses MV prediction to generate predicted MVs, and the difference between the MVs used for motion compensation and the predicted MVs is encoded as residual motion data and stored in the bitstream 795.

The MV prediction module 775 generates the predicted MVs based on reference MVs that were generated for encoding previously video frames, i.e., the motion compensation MVs that were used to perform motion compensation. The MV prediction module 775 retrieves reference MVs from previous video frames from the MV buffer 765. The video encoder 700 stores the MVs generated for the current video frame in the MV buffer 765 as reference MVs for generating predicted MVs.

The MV prediction module 775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 795 by the entropy encoder 790.

The entropy encoder 790 encodes various parameters and data into the bitstream 795 by using entropy-coding techniques such as context-adaptive binary arithmetic coding (CABAC) or Huffman encoding. The entropy encoder 790 encodes various header elements, flags, along with the quantized transform coefficients 712, and the residual motion data as syntax elements into the bitstream 795. The bitstream 795 is in turn stored in a storage device or transmitted to a decoder over a communications medium such as a network. Some of the up-down sampling parameters (e.g., down-sampling enable/disable, ratio, effective bit-depths, up-sampling method, etc.) for different color components may be signaled as encoded syntax elements in the bitstream 795.

The in-loop filter 745 performs filtering or smoothing operations on the reconstructed pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
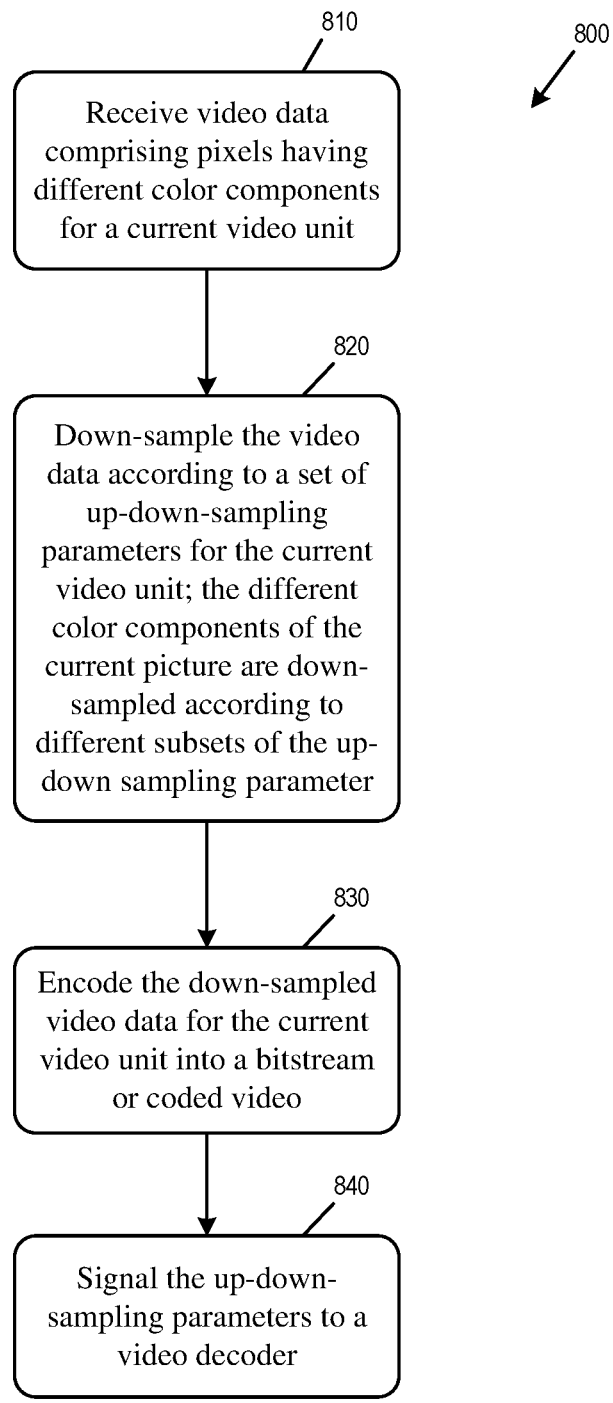
FIG. 8 conceptually illustrates a process for down-sampling and encoding video.

FIG. 8 conceptually illustrates a process 800 for down-sampling and encoding video. In some embodiments, one or more processing units (e.g., a processor) of a computing device implementing the video encoding system 501 (that includes the down-sampling system 510 and the video encoder 520) performs the process 800 by executing instructions stored in a computer readable medium. In some embodiments, an electronic apparatus implementing the video encoding system 501 performs the process 800.

The encoding system receives (at block 810) video data that includes pixels having different color components for a current video unit. The current video unit may be any one of a picture, a frame, a group of pictures, a sequence, a slice, a coding tree unit (CTU), a coding unit, or a block of samples.

The encoding system down-samples (at block 820) the video data according to a set of up-down-sampling parameters for the current video unit. The up-down-sampling parameters may include a first down-sampling ratio for a first color component and a second down-sampling ratio for a second color component. The up-down-sampling parameters may include a first reduced or effective bit-depth for a first color component and a second reduced bit-depth for a second color component (reduced effective bit-depth due to down-sampling.) The up-down-sampling parameters may include a first flag for enabling down-sampling for a first color component and a second flag for enabling down-sampling for a second color component. The up-down-sampling parameters may include a first flag for enabling down-sampling for a first color component and a second flag for enabling down-sampling for a second color component. The up-down-sampling parameters specify a first up-sampling method for a first color component and second sampling method for a second color component. The first and second up-sampling methods may be selected from multiple up-sampling options that include using a neural network or a standard up-sampling filter.

The different color components of the current video unit are down-sampled according to different subsets of the up-down-sampling parameters. The different subsets of the up-down-sampling parameters may include a first subset for luma pixels and second subset for chroma pixels. The different subsets of the up-down-sampling parameters may include three subsets for three different color components (e.g., Y/Cb/Cr, R/G/B) respectively.

The up-down-sampling parameters may include parameters that change from a first video unit to a second video unit. The up-down-sampling parameters may include parameters that are explicitly signaled in the bitstream and may be contained in one of a sequence parameter set (SPS), a picture parameter set (PPS), a picture header (PH). The up-down-sampling parameters may include parameters that are applicable at slice level, coding tree unit (CTU) level, coding unit (CU) level, or block-level.

The encoding system encodes (at block 830) the down-sampled video data for the current video unit into a bitstream or coded video. The down-sampled video data may be encoded by the video encoder 700.

The encoding system signals (at block 840) the up-down-sampling parameters in the bitstream or coded video to a video decoding system for up-sampling the video after it is decoded. The up-down-sampling parameters may include parameters signaled expressly (as syntax elements) in the bitstream. The up-down-sampling parameters may also include parameters that can be derived implicitly from characteristics of the current video unit or other information available to a decoding system without express signaling.

Figure 9:
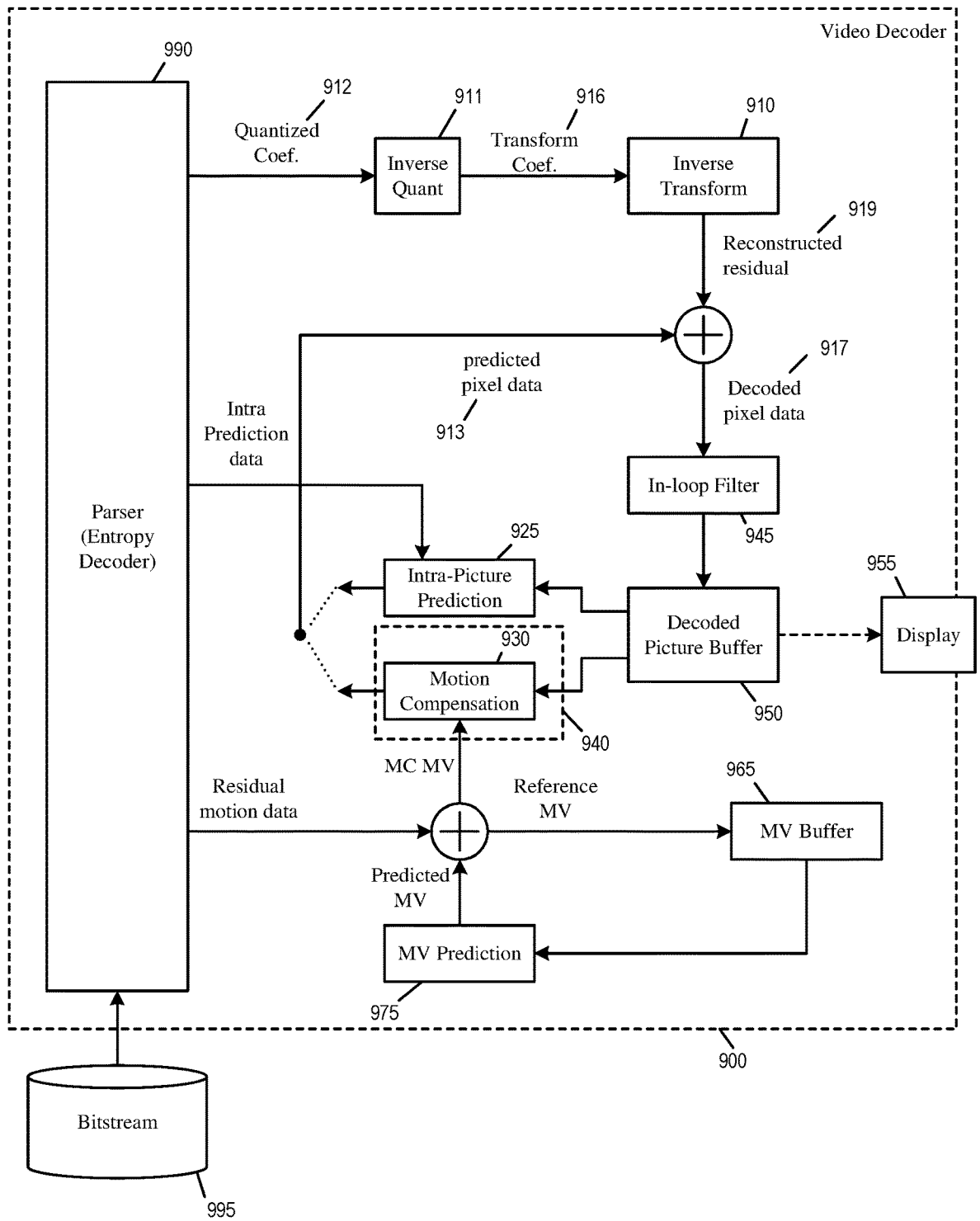
FIG. 9 illustrates an example video decoder that can be used to decode video to be up-sampled.

FIG. 9 illustrates an example video decoder 900 that can be used to decode video to be up-sampled. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 911, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding. Some of the up-down sampling parameters (e.g., down-sampling enable/disable, ratio, effective bit-depths, up-sampling method, etc.) for different color components may be signaled as encoded syntax elements in the bitstream 995. The parser 990 may derive some of the implied up-down sampling parameters from other information, such as the size of the current block, etc.

The inverse quantization module 911 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
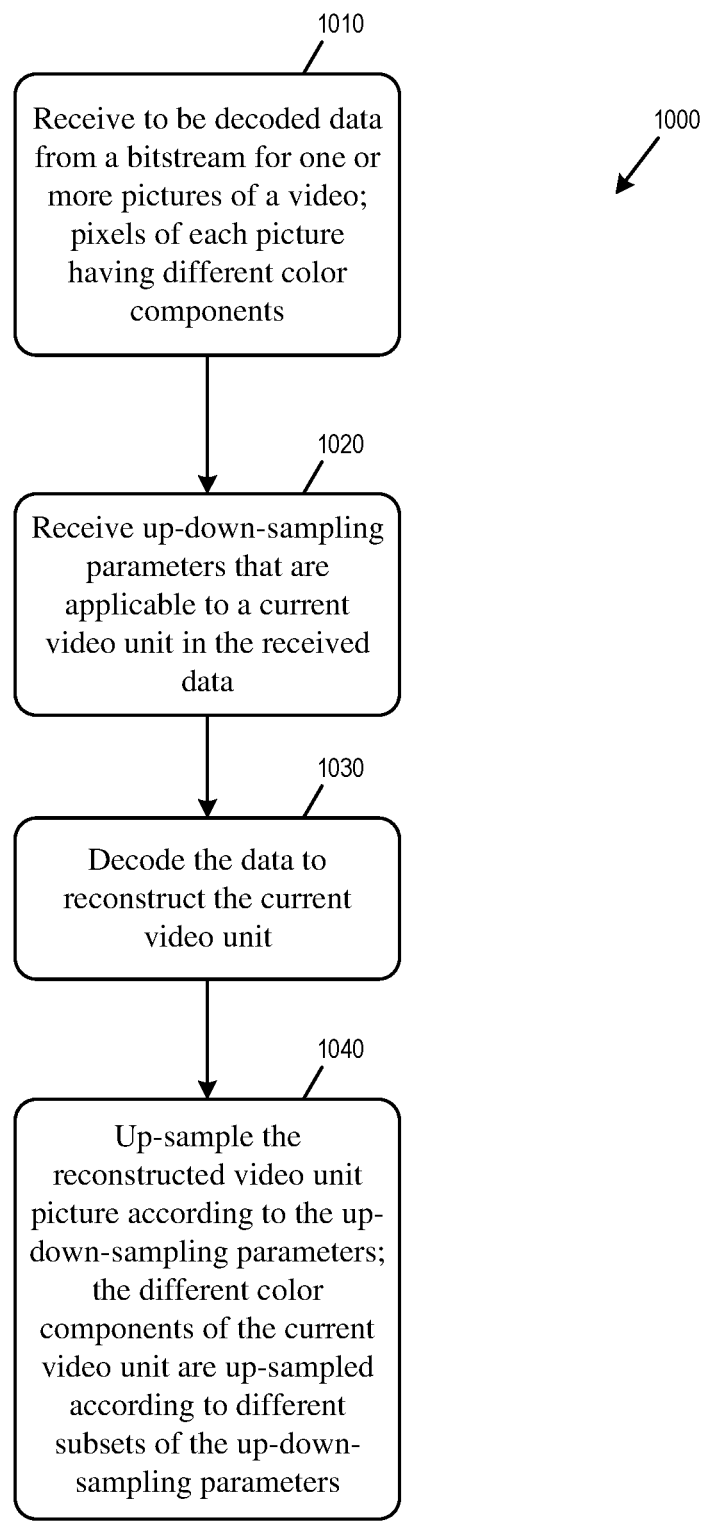
FIG. 10 conceptually illustrates a process for decoding and up-sampling video.

FIG. 10 conceptually illustrates a process 1000 for decoding and up-sampling video. In some embodiments, one or more processing units (e.g., a processor) of a computing device implementing the video decoding system 502 (that includes the video decoder 530 and the up-sampling/super-resolution system 540) performs the process 1000 by executing instructions stored in a computer readable medium. In some embodiments, an electronic apparatus implementing the video decoding system 502 performs the process 1000.

The decoding system receives (at block 1010) to be decoded data from a bitstream for one or more pictures of a video. Pixels of each picture have different color components.

The decoding system receives (at block 1020) up-down-sampling parameters that are applicable to a current video unit. The current video unit may be any one of a picture, a frame, a group of pictures, a sequence, a slice, a coding tree unit (CTU), a coding unit, or a block of samples. The up-down-sampling parameters may include parameters signaled expressly (as syntax elements) in the bitstream. The up-down-sampling parameters may also include parameters that can be derived implicitly from characteristics of the current video unit or other information available to the decoding system without express signaling.

The up-down-sampling parameters may include different subsets of parameters for different color components. The up-down-sampling parameters may include a first down-sampling ratio for a first color component and a second down-sampling ratio for a second color component. The up-down-sampling parameters may include a first reduced or effective bit-depth for a first color component and a second reduced bit-depth for a second color component (reduced effective bit-depth due to down-sampling.) The up-down-sampling parameters may include a first flag for enabling down-sampling for a first color component and a second flag for enabling down-sampling for a second color component. The up-down-sampling parameters may include a first flag for enabling down-sampling for a first color component and a second flag for enabling down-sampling for a second color component. The up-down-sampling parameters specify a first up-sampling method for a first color component and second sampling method for a second color component. The first and second up-sampling methods may be selected from multiple up-sampling options that include using a neural network or a standard up-sampling filter.

The decoding system decodes (at block 1030) the data to reconstruct the current video unit. The decoding system up-samples (at block 1040) the reconstructed current video unit according to the up-down-sampling parameters. The decoding system may then provide the up-sampled current video unit for display. The different color components of the current video unit are up-sampled according to the different subsets of the up-down-sampling parameters. The different subsets of the up-down-sampling parameters may include a first subset for luma pixels and second subset for chroma pixels. The different subsets of the up-down-sampling parameters may include three subsets for three different color components (e.g., Y/Cb/Cr, R/G/B) respectively.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
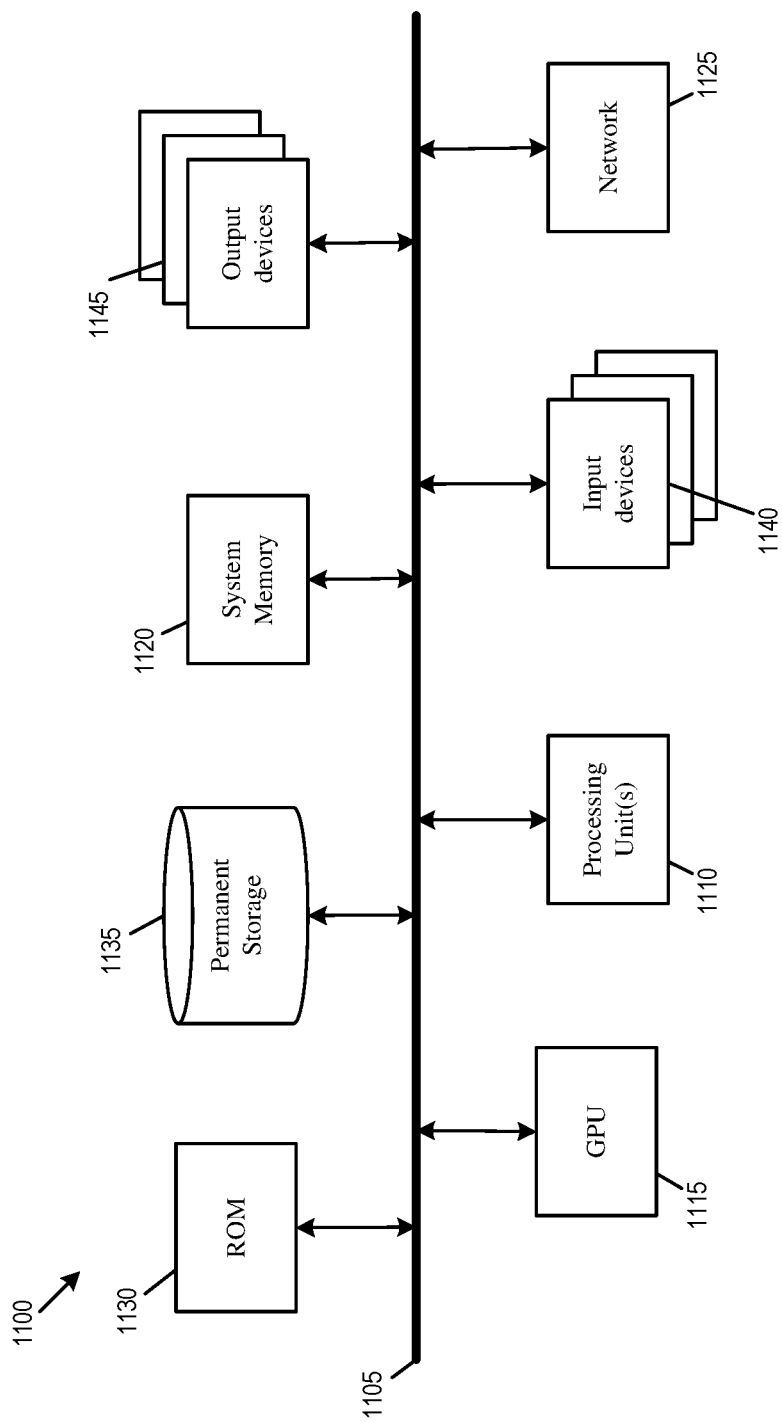
FIG. 11 conceptually illustrates an electronic system with which some embodiments of the present disclosure are implemented.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 8 and FIG. 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
receiving to be decoded data from a bitstream for one or more pictures, each picture comprising pixels having different color components;
receiving up-down-sampling parameters that are applicable to a current video unit in the received data, wherein the up-down-sampling parameters comprise a first down-sampling ratio and a second down-sampling ratio, the first down-sampling ratio is associated with generation of a first down-sampled data of a first color component in the current video unit, and the second down-sampling ratio is associated with generation of a second down-sampled data of a second color component in the current video unit, wherein the first color component and the second color component are different;
decoding the data to reconstruct the current video unit; and
up-sampling the reconstructed current video unit according to the up-down-sampling parameters to generate an up-sampled first color component data associated with the first down-sampled data, and an up-sampled second color component data associated with the second down-sampled data, wherein the different color components of the current video unit are up-sampled according to different subsets of the up-down-sampling parameters.

2. The video decoding method of claim 1, wherein the different subsets of the up-down-sampling parameters comprise a first subset for luma pixels and second subset for chroma pixels.

3. The video decoding method of claim 1, wherein the up-down-sampling parameters further comprise a third down-sampling ratio, wherein the first down-sampling ratio is for a Y component, the second down-sampling ratio is for one of Cb and Cr components, and the third down-sampling ratio is for the other one of Cb and Cr components, wherein the first down-sampling ratio, the second down-sampling ratio, and the third down-sampling ratio are different.

4. The video decoding method of claim 1, wherein the first down-sampling ratio is for a Y component and the second down-sampling ratio is for at least one of Cb and Cr components.

5. The video decoding method of claim 1, wherein the up-down-sampling parameters further comprise a first reduced bit-depth for the first color component and a second reduced bit-depth for the second color component.

6. The video decoding method of claim 1, wherein the up-down-sampling parameters further comprise a first flag indicating that a down-sampling of the first color component was enabled and a second flag indicating that a down-sampling of the second color component was enabled.

7. The video decoding method of claim 1, wherein the up-down-sampling parameters further comprises corresponding parameters that specify a first up-sampling method for a first color component and a second up-sampling method for a second color component.

8. The video coding method of claim 7, wherein the first and second up-sampling methods are selected from a plurality of up-sampling options that include using a neural network.

9. The video decoding method of claim 1, wherein the up-down-sampling parameters comprise parameters signaled expressly in the bitstream.

10. The video decoding method of claim 9, wherein the up-down-sampling parameters further comprise parameters derived implicitly.

11. The video decoding method of claim 1, wherein the up-down-sampling parameters comprise parameters that change from a first video unit to a second unit.

12. The video decoding method of claim 1, wherein the up-down-sampling parameters comprise parameters that are explicitly signaled in the bitstream and may be contained in one of a sequence parameter set (SPS), a picture parameter set (PPS), a picture header (PH).

13. The video decoding method of claim 1, wherein the up-down-sampling parameters comprise parameters that are applicable at coding tree unit (CTU) level, coding unit (CU) level, or block-level.

14. The video decoding method of claim 1, wherein the current video unit is one of a frame, a picture, a group of pictures, a sequence, a coding unit (CU), a coding tree unit (CTU), and a block of samples.

15. A video encoding method comprising:
receiving video data comprising pixels having different color components for a current video unit;
down-sampling the video data according to a set of up-down-sampling parameters for the current video unit, comprising:
performing a first down-sampling process on an original first color component data in the current video unit according to a first down-sampling ratio to generate a first down-sampled data of a first color component; and
performing a second down-sampling process on an original second color component data in the current video unit according to a second down-sampling ratio to generate a second down-sampled data of a second color component, wherein the first color component and the second color component are different;
encoding the first down-sampled data and the second down-sampled data for the current video unit into a bitstream; and
signaling the up-down-sampling parameters to a video decoder.

16. An electronic apparatus comprising:
a video decoder circuit configured to perform operations comprising:
receiving to be decoded data from a bitstream for one or more pictures of a video, each picture comprising pixels having different color components;
receiving up-down-sampling parameters that are applicable to a current video unit in the received data, wherein the up-down-sampling parameters comprise a first down-sampling ratio and a second down-sampling ratio, the first down-sampling ratio is associated with generation of a first down-sampled data of a first color component in the current video unit, and the second down-sampling ratio is associated with generation of a second down-sampled data of a second color component in the current video unit, wherein the first color component and the second color component are different;
decoding the data to reconstruct the current video unit; and
up-sampling the reconstructed current video unit according to the up-down-sampling parameters to generate an up-sampled first color component data associated with the down-sampled first color component data, and an up-sampled second color component data associated with the down-sampled second color component data, wherein the different color components of the current video unit are up-sampled according to different subsets of the up-down-sampling parameters.

17. An electronic apparatus comprising:
an encoder circuit configured to perform operations comprising:
receiving video data comprising pixels having different color components for a current video unit;
down-sampling the video data according to a set of up-down-sampling parameters for the current video unit, comprising:
performing a first down-sampling process on an original first color component data in the current video unit according to a first down-sampling ratio to generate a first down-sampled data of a first color component; and
performing a second down-sampling process on an original second color component data in the current video unit according to a second down-sampling ratio to generate a second down-sampled data of a second color component, wherein the first color component and the second color component are different;
encoding the first down-sampled data and the second down-sampled data for the current video unit into a bitstream; and
signaling the up-down-sampling parameters to a video decoder.

18. The video decoding method of claim 1, wherein the first down-sampling ratio for the first color component is different from the second down-sampling ratio for the second color component.

19. The video decoding method of claim 1, wherein the bitstream is associated with a YCbCr video, Cb and Cr components of the YCbCr video is encoded with a bit depth lower than an internal bit depth, and a Y component of the YCbCr video is encoded with a maximum bit depth.

20. The video decoding method of claim 1, wherein the first down-sampling ratio and the second down-sampling ratio are not equal to 1.

* * * * *